Aug. 3, 1926.
E. R. THOMAS
ROD COUPLING
Filed Nov. 6, 1925
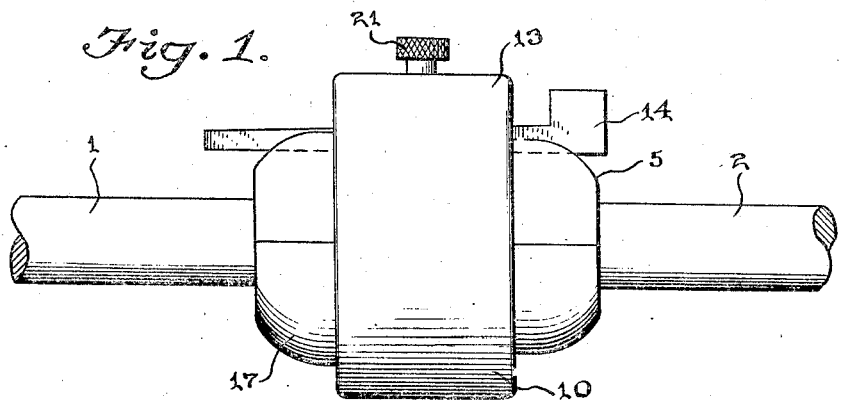
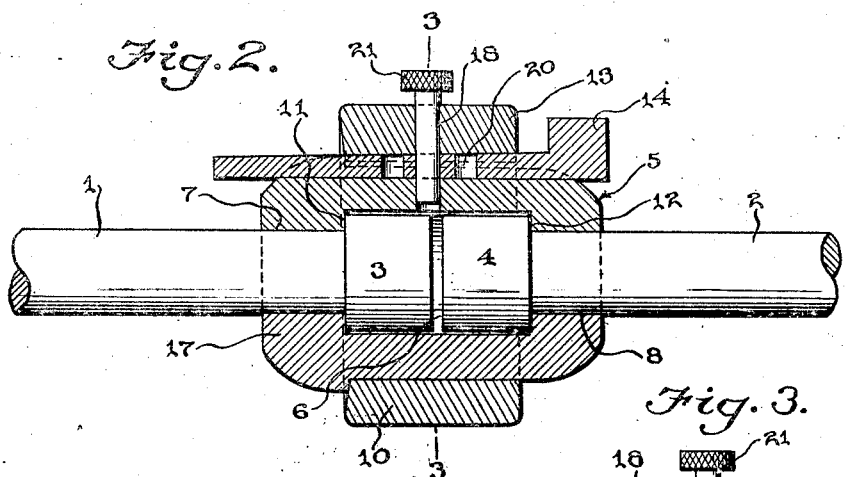
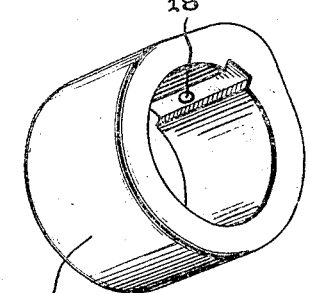
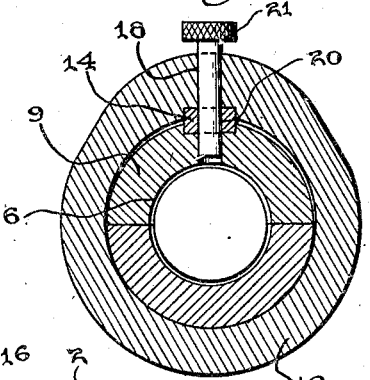
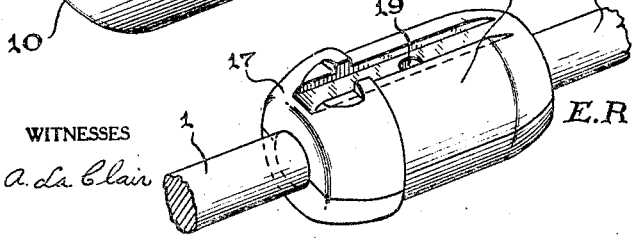
E. R. Thomas INVENTOR Patented Aug. 3, 1926.

1,594,698

UNITED STATES PATENT OFFICE.

ELMER R. THOMAS, OF DENOYA, OKLAHOMA.

ROD COUPLING.

Application filed November 6, 1925. Serial No. 67,357.

This invention relates to rod couplings and particularly to that type of coupling adapted to detachably hold in operative relation the abutting ends of reciprocating members such as the sections of the surface rod used in oil pumping operations, to connect a source of power with the pump jack.

One of the objects of the invention is the construction of a coupling which will efficiently perform the function of holding together the ends of the rod sections, while at the same time being quickly applicable thereto or detachable therefrom.

Another object of the invention is to provide a coupling of the type designated which is simple in construction, sturdy in design and inexpensive to manufacture.

A further object of the invention is the provision of a coupling that may be repeatedly put together or undone, without deterioration of the coupling or damage to the coupled members.

Other objects of the invention will appear as the following description of a preferred embodiment of the invention proceeds.

In the drawings:

Figure 1 is a front elevation of the coupling.

Figure 2 is a longitudinal section through the same.

Figure 3 is a cross section taken along the line 3—3 of Figure 2.

Figure 4 is a perspective view of the clamping ring.

Figure 5 is a view in perspective of the coupling with the key and clamping ring removed.

Referring now in detail to the several figures, the numerals 1 and 2 refer to the adjacent ends of the rod sections which are to be coupled, said ends terminating in enlarged heads 3 and 4.

The coupling consists of a sleeve denoted generally by the numeral 5 having an enlarged chamber 6 for receiving the heads of the rod sections, and being formed at its opposite ends with contracted bores 7 and 8, adapted to embrace the rod sections back of the heads 3 and 4. The sleeve 5 is formed as a split ring, the halves 9 and 10 of which may be conveniently positioned on opposite sides of the adjacent ends of the rod sections in mounting the coupling. The annular shoulders 11 and 12 formed between the walls of the chamber 6 and the contracted bores 7 and 8, engage the heads of the rod sections and prevent them withdrawing from the coupling when the rod is tensioned.

The halves of the sleeve 5 are held together, and preferably in snug relation to the parts of the rod sections of smaller diameter, by means of a clamping ring 13, which fits freely upon an intermediate cylindrical seat 16 formed on the sleeve 5. Said sleeve and the clamping ring 13 are formed with registering channels constituting a keyway for the insertion of the wedge-shaped key 14, said channels being so arranged that the pressure exerted by the key is transmitted in a direction perpendicular to the plane of separation of the halves of the sleeve, thereby clamping said halves together.

The sleeve 5 is formed externally with an enlarged zone 17 adjacent one end, forming with the ring seat 16, an annular shoulder which functions as a limit stop to the longitudinal movement of the ring in one direction. The purpose of this is two-fold, both to prevent the ring slipping when the wedge is driven home, and to locate the ring in a position in which the aperture 18 in the ring alines with the aperture 19 formed in the sleeve 5. Both of said apertures open in the keyway. The key 14 is provided with a series of holes 20, and the key is adapted to be driven in until one of the holes 20 registers with the alined apertures 18 and 19. A key retaining pin 21 is then introduced into the passage thus formed, and held in place frictionally or otherwise.

The coupling is dismounted by reversing the order of operations in which it was assembled.

While I believe that the embodiment of the invention alone described is efficient and practical in performing the functions for which it is designed, I desire it to be understood the invention is capable of such breadth in the variation or alteration of structural details as is permitted by the scope of the appended claims.

What I claim is:

1. A coupling comprising a divided sleeve having a passage extending longitudinally therethrough defining an enlarged intermediate chamber and contracted bores, with annular shoulders therebetween, reciprocatory headed rods with the heads thereof housed in said chamber and confined by said shoulders, said sleeve being adapted to surround said rods, a ring surrounding said sleeve and longitudinally movable thereupon, said sleeve being formed with a stop to limit the longitudinal movement of said ring, a wedge shaped key forcible between said ring and sleeve, and a key retaining pin insertable in alined openings in said ring, key and sleeve.

2. A coupling including a divided sleeve adapted to receive the ends of rods to be coupled, a ring surrounding said sleeve, a wedge insertable between said ring and sleeve for drawing the parts of said sleeve together, said wedge being formed with a series of holes, and a pin passing through one of said holes and through alined apertures in said ring and sleeve for retaining said wedge.

ELMER R. THOMAS.